US012435897B2

(12) United States Patent
Paquette

(10) Patent No.: US 12,435,897 B2
(45) Date of Patent: Oct. 7, 2025

(54) SYSTEM AND METHOD FOR ACQUISITION AND STORAGE OF DATA FROM A BACNET STANDARD HVAC SYSTEM

(71) Applicant: STRATO AUTOMATION INC., Québec (CA)

(72) Inventor: Pierre Paquette, Québec (CA)

(73) Assignee: STRATO AUTOMATION INC., Montréal (CA)

( * ) Notice: Subject to any disclaimer, the term of this patent is extended or adjusted under 35 U.S.C. 154(b) by 309 days.

(21) Appl. No.: 17/759,751

(22) PCT Filed: Jan. 29, 2021

(86) PCT No.: PCT/CA2021/050105
§ 371 (c)(1),
(2) Date: Jul. 29, 2022

(87) PCT Pub. No.: WO2021/151210
PCT Pub. Date: Aug. 5, 2021

(65) Prior Publication Data
US 2023/0062090 A1      Mar. 2, 2023

Related U.S. Application Data

(60) Provisional application No. 62/968,658, filed on Jan. 31, 2020.

(51) Int. Cl.
*F24F 11/58* (2018.01)
*F24F 11/46* (2018.01)
(Continued)

(52) U.S. Cl.
CPC .............. *F24F 11/58* (2018.01); *F24F 11/46* (2018.01); *F24F 11/54* (2018.01); *F24F 11/64* (2018.01);
(Continued)

(58) Field of Classification Search
None
See application file for complete search history.

(56) References Cited

U.S. PATENT DOCUMENTS 6,487,457 B1* 11/2002 Hull ..................... G05B 19/042
700/86
2009/0055765 A1    2/2009 Donaldson
(Continued)

OTHER PUBLICATIONS

Mackinnon, David (Authorized Officer), International Search Report and Written Opinion of the International Searching Authority, dated Apr. 8, 2021 for International Application No. PCT/CA2021/050105, 16 pages.

*Primary Examiner* — Ariel Mercado-Vargas
(74) *Attorney, Agent, or Firm* — MH2 Technology Law Group, LLP

(57) ABSTRACT

A system for acquisition and storage of data relative to BACnet objects of a BACnet standard HVAC system having BACnet network, where BACnet objects each generate change data upon occurrence of a change in a value thereof and a controller receives and concatenates the change data of the plurality of BACnet objects into payloads encapsulated into system specific data packets conforming to the BACnet data packet standards and transmitted over the BACnet network. The system also has a data conversion unit receiving the system specific data packets, retrieving the change data therefrom and generating database write commands including the change data. The system also comprises a main data acquisition database in data communication with the data conversion unit and receiving the database write commands therefrom. The main data acquisition database stores the data relative to all data changes of the standard BACnet objects over time.

16 Claims, 3 Drawing Sheets

(51) Int. Cl.
*F24F 11/54* (2018.01)
*F24F 11/64* (2018.01)
*G05B 19/042* (2006.01)
*H04L 67/1095* (2022.01)
*H04L 67/12* (2022.01)

(52) U.S. Cl.
CPC ........ *G05B 19/042* (2013.01); *H04L 67/1095* (2013.01); *G05B 2219/2614* (2013.01); *H04L 67/12* (2013.01)

(56) References Cited

U.S. PATENT DOCUMENTS

| | | | |
|---|---|---|---|
| 2009/0287736 A1 | 11/2009 | Shike et al. | |
| 2014/0343886 A1* | 11/2014 | Berinato | G05B 23/0256 |
| | | | 702/123 |
| 2017/0295058 A1 | 10/2017 | Gottschalk | |
| 2018/0202675 A1* | 7/2018 | Park | G05B 15/02 |
| 2019/0260674 A1* | 8/2019 | Ostwal | G05B 19/042 |
| 2019/0353378 A1 | 11/2019 | Ramamurti | |
| 2020/0073342 A1* | 3/2020 | Lee | G05B 17/02 |
| 2020/0076196 A1* | 3/2020 | Lee | G05B 13/042 |

* cited by examiner

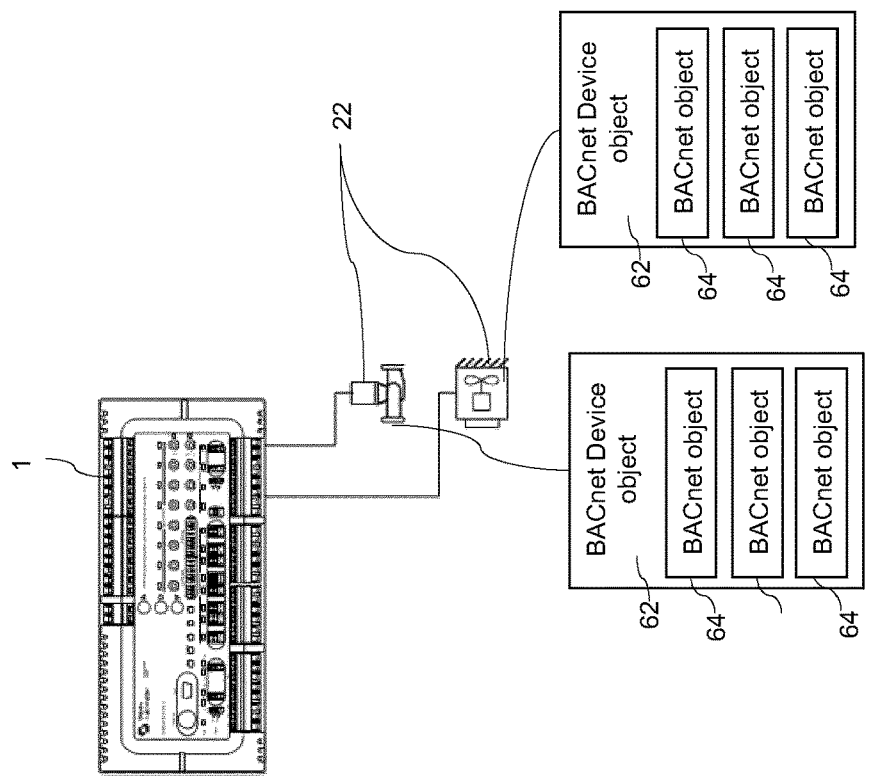
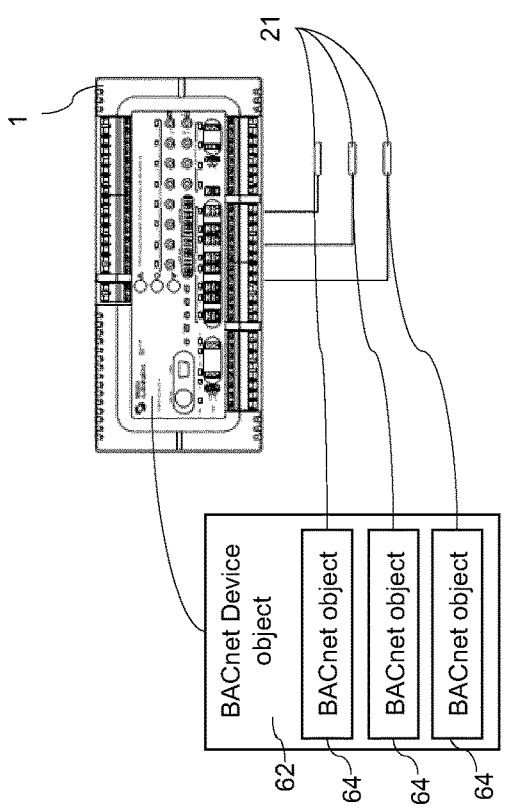
Figure 2b
Figure 2a

SYSTEM AND METHOD FOR ACQUISITION AND STORAGE OF DATA FROM A BACNET STANDARD HVAC SYSTEM

CROSS-REFERENCE TO RELATED APPLICATIONS

This application is a U.S. National Stage application of PCT/CA2021/050105 filed 29 Jan. 2021, which claims priority to U.S. Provisional Application No. 62/968,658 filed 31 Jan. 2020, the entire disclosures of which are herein incorporated by reference.

TECHNICAL FIELD OF THE INVENTION

The present invention relates to the field of data acquisition and storage relative to building energy management. More particularly, it relates to a system and a computer implemented method which are designed to allow data collection and storage from a building energy management system using a BACnet standard, and the subsequent access to the collected data, for example by a machine learning optimization service, without requiring query of the data on the corresponding BACnet standard system.

BACKGROUND

In the field of energy management for buildings using automation and control systems, it is common for the corresponding systems to perform energy management based on data received from sensors and/or other equipment communicating using BACnet standards (or protocol).

Systems using this standard commonly include control devices providing physical inputs and outputs to sensors and other equipment deployed around the building to be managed, in order to control the sensors and equipment and perform the desired adjustments, for example in applications such as heating, ventilation, and air-conditioning control (HVAC). Advantageously, the BACnet protocol provides mechanisms for computerized building automation devices in order to perform data exchange, independently of the building service being performed.

Systems using the BACnet standard however tend to suffer from several drawbacks. For example and without being limitative, these systems are prone to network congestion. Hence, in systems using the BACnet standards, there is a need to determine which data to log from the sensors and equipment, for example through selection of the logging method between "COV" (Change of value) or "Polling" (with a selection of a "poll" period in this latter case). Such a selection of the data to be logged greatly limits the collection of data and consequently the data available for subsequent analysis to determine trends in the energy management of the building, which in turn limits the possible data analysis for control of the HVAC system.

In view of the above, there is a need for an improved system and method which would be able to overcome or at least minimize some of the above-discussed prior art concerns.

SUMMARY OF THE INVENTION

In accordance with a first general aspect, there is provided a system for acquisition and storage of data relative to BACnet objects of a BACnet standard HVAC system. The system comprises the BACnet HVAC system including at least one controller and a plurality of BACnet objects each generating data relative to a data change upon occurrence of a change in a value of the corresponding one of the BACnet objects and being connected to a corresponding one of the at least one controller. The BACnet HVAC system has a BACnet network and the at least one controller is configured to concatenate the data relative the data changes of the plurality of BACnet objects into payloads encapsulated into system specific data packets conforming to the BACnet data packet standards and transmitted over the BACnet network. The system also comprises a data conversion unit in data communication with the BACnet HVAC system over the BACnet network and receiving the system specific data packets. The data conversion unit is configured to retrieve the data relative to the data changes of the standard BACnet objects from the received system specific data packets and to generate database write commands including the data relative to the data changes of the standard BACnet objects acquired from the system specific data packets. The system also comprises a main data acquisition database in data communication with the data conversion unit and receiving the database write commands therefrom. The main data acquisition database stores the data relative to all data changes of the standard BACnet objects.

In an embodiment, the data conversion unit and the main data acquisition database are either hosted on a same central system computing device or on distinct computing devices connected over a local network.

In an embodiment, the system further comprises a cloud-based replicated data acquisition database running in a cloud infrastructure and a synchronization process unit configured to maintain the replicated data acquisition database synchronized with the main data acquisition database. The synchronization process unit is connectable to the main data acquisition database to receive data from the main data acquisition database and to replicate the data from the main data acquisition database on the replicated data acquisition database to perform synchronization therebetween.

In an embodiment, the system further comprises a machine learning energy management service using machine learning to optimize parameters and control of the BACnet standard HVAC system. The machine learning energy management service is connected to one of the main data acquisition database and the replicated data acquisition database and uses at least one data set including at least a subset of the data stored in the one of the main data acquisition database and the replicated data acquisition database for generating optimization parameter data.

In an embodiment, the optimization parameter data is directed towards at least one of a minimization of the energy consumption of a building implementing the BACnet standard HVAC system and the maximization of the comfort of occupants of the corresponding building.

In an embodiment, the optimization parameter data generated by the machine learning energy management service is used by the BACnet standard HVAC system for controlling the HVAC devices thereof.

In an embodiment, the optimization parameter data is communicated to the controller, which subsequently controls the HVAC devices of the BACnet standard HVAC system in accordance with optimized parameters of the optimization parameter data.

In an embodiment, the data relative to all data changes of the standard BACnet objects stored in the main data acquisition database spans over at least a time period covering different seasons. The machine learning energy management service is configured to anticipate and predict building behavior, according to each season.

In an embodiment, the standard BACnet objects are configured to generate and push data relative to the data changes of the standard BACnet objects to the controller, every time a change occurs in a value thereof.

In an embodiment, wherein the standard BACnet objects are further configured to generate and push data relative to the data changes of a corresponding one of the standard BACnet objects to the controller, after a time threshold is reached without occurrence of a data change in the corresponding one of the standard BACnet objects.

In accordance with another general aspect, there is provided a method for acquisition and storage of data relative to BACnet objects of a BACnet standard HVAC system operating over a BACnet network and including a controller. The method comprises the steps of: mapping standard BACnet objects of the BACnet standard HVAC system, each one of the standard BACnet objects generating data relative to data changes upon changes in value thereof; pushing data relative to the data changes of a corresponding one of the standard BACnet objects onto the BACnet network every time a change occurs in a value thereof; concatenating the data relative to the data changes of the standard BACnet objects in custom data payloads and generating system specific data packets including the custom data payloads and conforming to the BACnet data packet standards; transmitting the system specific data packets over the BACnet network; receiving the custom data payloads included in the system specific data packets and generating database write commands including the data relative to the data changes of the standard BACnet objects; and communicating the database write command to a main data acquisition database storing all the data relative to data changes of the standard BACnet objects over time.

In an embodiment, the method further comprises the step of generating and maintaining a cloud-based replicated data acquisition database synchronized with the main data acquisition database.

In an embodiment, the step of generating and maintaining a cloud-based replicated data acquisition database synchronized with the main data acquisition database comprises connecting to the main data acquisition database with a synchronization process unit, receiving data from the main data acquisition database by the synchronization process unit and replicating the data from the main data acquisition database on the replicated data acquisition database using the synchronization process unit.

In an embodiment, the method further comprises the step of generating optimization parameter data relative to the parameters and control of the BACnet standard HVAC system, the optimization parameter data being generated by machine learning using at least one machine learning model using at least one data set including at least a subset of the data stored in one of the replicated data acquisition database and the main data acquisition database.

In an embodiment, the optimization parameter data is directed towards at least one of a minimization of the energy consumption of a building implementing the BACnet standard HVAC system and the maximization of the comfort of occupants of the corresponding building.

In an embodiment, the method further comprises the step of controlling HVAC devices of the BACnet standard HVAC system using the optimization parameter data.

In an embodiment, the method further comprises the step of communicating the optimization parameter data to the controller, the controller subsequently controlling the HVAC devices of the BACnet standard HVAC system in accordance with optimized parameters of the optimization parameter data.

In an embodiment, the step of pushing data relative to a data changes of a corresponding one of the standard BACnet objects onto the BACnet network every time a change occurs in a value thereof includes pushing the data relative to the data changes of the corresponding one of the standard BACnet objects to the controller.

In an embodiment, the method further comprises the step of pushing data relative to a data changes of a corresponding one of the standard BACnet objects onto the BACnet network, after a time threshold is reached without occurrence of a data change in the corresponding one of the standard BACnet objects.

In an embodiment, the step of pushing data relative to a data changes of a corresponding one of the standard BACnet objects onto the BACnet network, after a time threshold is reached without occurrence of a data change in the corresponding one of the standard BACnet objects includes pushing the data relative to the data changes of the corresponding one of the standard BACnet objects to the controller.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which:

FIGS. 2a and 2b show schematic representations of the standard BACnet objects of the BACnet standard HVAC system of FIG. 1, in accordance with different embodiments.

DETAILED DESCRIPTION

Figure 1:
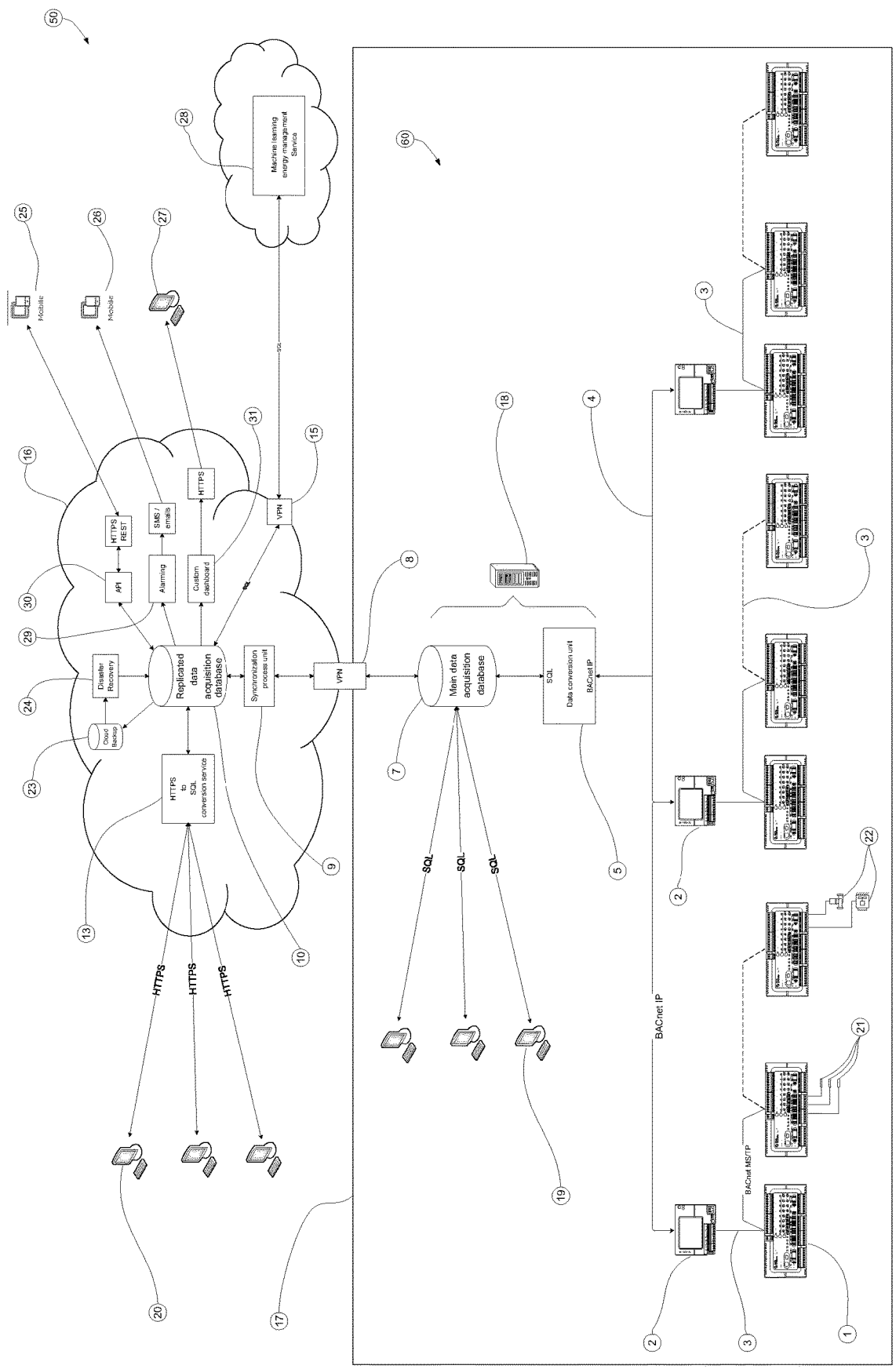
FIG. 1 is a schematic representation of the system for acquisition and storage of data relative to BACnet objects of a BACnet standard HVAC system, in accordance with an embodiment.

In the following description, the same numerical references refer to similar elements. The embodiments, geometrical configurations, materials mentioned and/or dimensions shown in the figures or described in the present description are embodiments only, given solely for exemplification purposes.

Moreover, although the embodiments of the system for acquisition and storage of data from a BACnet standard HVAC system and corresponding parts thereof consist of certain components as explained and illustrated herein, not all of these components are essential and thus should not be taken in their restrictive sense. It is to be understood, as also apparent to a person skilled in the art, that other suitable components and cooperation thereinbetween, as well as other suitable configurations, may be used for the system for acquisition and storage of data from a BACnet standard HVAC system, as will be briefly explained herein and as can be easily inferred herefrom by a person skilled in the art.

Moreover, although the associated method includes steps as explained and illustrated herein, not all of these steps are necessarily essential and thus should not be taken in their restrictive sense. It will also be appreciated that the steps of the method for acquisition and storage of data from a BACnet standard HVAC system described herein may be performed in the described order, or in any suitable order. Steps of the proposed method are implemented as software instructions and algorithms, stored in computer memory and executed by processors. It should be understood that servers and computers are required to implement to proposed system, and to execute the proposed method.

To provide a more concise description, some of the quantitative and qualitative expressions given herein may be qualified with the terms "about" and "substantially". It is understood that whether the terms "about" and "substantially" are used explicitly or not, every quantity or qualification given herein is meant to refer to an actual given value or qualification, and it is also meant to refer to the approximation to such given value or qualification that would reasonably be inferred based on the ordinary skill in the art, including approximations due to the experimental and/or measurement conditions for such given value.

The term "computing device" is used to encompass computers, servers and/or specialized electronic devices which receive, process and/or transmit data. "Computing devices" are generally part of "systems" and include processing means, such as microcontrollers and/or microprocessors, CPUs or are implemented on FPGAs, as examples only. The processing means are used in combination with storage medium, also referred to as "memory" or "storage means". Storage medium can store instructions, algorithms, rules and/or trading data to be processed. Storage medium encompasses volatile or non-volatile/persistent memory, such as registers, cache, RAM, flash memory, ROM, as examples only. The type of memory is of course chosen according to the desired use, whether it should retain instructions, or temporarily store, retain or update data.

One skilled in the art will therefore understand that each such computing device typically includes a processor (or multiple processors) that executes program instructions stored in a memory or other non-transitory computer-readable storage medium or device (e.g., solid state storage devices, disk drives, etc.). The various functions, modules, services, units or the like disclosed hereinbelow can be embodied in such program instructions, and/or can be implemented in application-specific circuitry (e.g., ASICs or FPGAs) of the computer system. Where the computer system includes multiple computing devices, these devices can, but need not, be co-located. In some embodiments, the computer system can be a cloud-based computing system whose processing resources are shared by multiple distinct business entities or other users.

In the course of the present description, the term HVAC, is not used in a restrictive sense and should not be interpreted this way. The term HVAC is rather used more generally to refer to any type of building energy management system and should not be strictly limited to heating, ventilation and air conditioning. Hence, in the course of the present description any additional component which can be monitored and/or controlled to impact on the temperature of a building and the energetic need to control the temperature, such as lighting control, shading control or the like, can be encompassed in this term.

In the course of the present description, the term "BACnet" is used to refer to the BACnet data communication protocol (Building Automation and Control networks protocol). The BACnet data communication protocol defines a specific set of rules governing the exchange of data over the corresponding computer network for communication of the connected components using this protocol, which relate specifically to the needs of building automation and control (BAC) equipment. The BACnet data communication protocol allow building systems from different manufacturers to interoperate through a combination of standardized representation of building automation equipment using BACnet objects each having a set of properties characterizing the object, standardized message types for monitoring and control of BACnet objects and standardized network technology (i.e. Ethernet, ARCNET, MS/TP (master-slave/token-passing), LonTalk or BACnet/IP).

Referring generally to FIGS. 1, 2a and 2b, in accordance with one embodiment, there is provided a system 50 for acquisition and storage of data relative to BACnet objects of a BACnet standard HVAC system 60.

In the embodiment shown in FIG. 1, the BACnet standard HVAC system 60 includes controllers 1, network managers 2, sensors 21 and HVAC devices 22 operating in cooperation to perform energy management in a corresponding building 17.

For example and without being limitative, in an embodiment the sensors 21 can include temperature sensors, solar load sensors, humidity sensors, air quality sensors, current consumption sensors, or other sensors monitoring parameters which can be used to perform energy management. For example and without being limitative, in an embodiment the HVAC devices 22 can include, heating units, ventilation units, air conditioning units, curtains, or other devices which can be controlled to perform the energy management.

In the embodiment shown, the BACnet standard HVAC system 60 includes a plurality of controllers 1 and a plurality of network managers 2, which is typical for large BACnet standard HVAC systems 60. One skilled in the art will however understand that, in alternative embodiments (not shown), a single controller 1, network manager 2, sensor 21 and/or HVAC device 22 could be provided, without departing from the scope of the present description. Similarly, it will be understood that in other alternative embodiments, more than the illustrated controllers 1, network managers 2, sensors 21 and/or HVAC devices 22 could also be provided, without departing from the scope of the present description.

For ease of description, in the course of the description below the terms controller 1, network manager 2, sensor 21 and HVAC device 22, will be used interchangeably in the singular form and the plural form, but it will be understood that similar teachings apply to a single or multiple instances of these elements.

In the embodiment shown, the controller 1, network manager 2, sensor 21 and HVAC device 22 are in data communication over a BACnet MS/TP network 3. Hence, the controller 1 provides physical inputs and outputs to each sensor 21 and HVAC device 22, deployed around a building 17, using the BACnet MS/TP network 3.

In an alternative embodiment (not shown), it will be understood that the sensor 21 and HVAC device 22 could communicate directly with the network manager 2 over a BACnet/IP network. One skilled in the art will also understand that, in other alternative embodiment, an architecture allowing the controller 1, network manager 2, sensor 21 and/or the HVAC device 22 to communicate using an Ethernet, ARCNET, or LonTalk BACnet network could be used.

Referring to FIGS. 1, 2a and 2b, in the embodiment shown, the controller 1 is configured to provide mapping of the standard BACnet objects 64 (i.e. logical representations used in the BACnet protocol which can be used to represent different aspects of a control system such as, for example and without being limitative, a device object, an analog input, an analog output, an analog value, a binary input, a binary output, a binary value, etc.). As can be seen, in an embodiment, the controller 1 can define a BACnet device object 62, with each sensor 21 in turn defining BACnet objects 64. Moreover, the HVAC device 22 can also define a BACnet device object 62, which in turn defines one or more BACnet object 64. The mapping provided by the controller 1, thereby provides standard inter-operability with the sensor 21 and the HVAC device 22, or any other $3^{rd}$ party device (not shown) which is BACnet compliant and is part of the BACnet standard HVAC system 60.

As can be seen in FIG. 1, the system 50 for acquisition and storage of data, also includes a main data acquisition database 7 and a data conversion unit (or data converter) 5 in data communication with the BACnet standard HVAC system 60 and cooperating therewith, to automatize data recording from the standard BACnet objects 64 of the BACnet standard HVAC system 60 into the main data acquisition database 7. As will be described in more details below, the system 50 for acquisition and storage of data is designed and configured to allow minimizing the load on the BACnet MS/TP network 3 of the BACnet standard HVAC system 60 and maintaining compatibility with actual building BACnet standards (and using most wiring infrastructure already in place).

In order to allow automated data acquisition of all the data generated by the standard BACnet objects 64 of the BACnet standard HVAC system 60 and storage of the data in the main data acquisition database 7, in an embodiment, the BACnet standard HVAC system 60 is configured to performed concatenation and transmission of data relative to data changes in the standard BACnet objects 64 in system specific data packets conforming to the BACnet data packet standards and having a custom tag identifying the data packet as specific to the system 50 described herein (i.e. tagged as being proprietary). Hence, in such an embodiment, the standard BACnet objects 64 are configured to generate and push data relative to the data changes of the standard BACnet objects 64 to the controller 1, every time a change occurs in a value thereof.

In the course of the present description the expression "data relative to data changes" or equivalent terms are used to define any data of standard BACnet objects 64 which can be logged following a change in a value of a standard BACnet object 64. The expression "change in a value of a standard BACnet object 64" or equivalent terms are understood to encompass any change to a present value or a status of the standard BACnet object 64.

In an embodiment, the controller 1 concatenates the received data relative to the data changes in custom data payloads referred herein as Private Value Status Flags (PVSF) and generates the system specific data packets conforming to the BACnet MS/TP data packet standards. The PVSF are encapsulated as payload in the system specific data packets and the system specific data packets are tagged as proprietary. The PVSF are configured to provide bandwidth optimization on the BACnet MS/TP network 3, in order to overcome the BACnet MS/TP limitations and allow all the data changes from the standard BACnet objects 64 to be transmitted and stored into the main data acquisition database 7, as will be described in more details below. In view of the above, using the PVSF, all the data changes in the standard BACnet objects 64 are pushed to the BACnet MS/TP network 3 by the controller 1, following the occurrence of the data change. In an embodiment, in order to ensure that the data of a standard BACnet object 64 is also logged into the main data acquisition database 7, in the occurrence of no data change after a predetermined time period, the data of a standard BACnet object 64 is transmitted to the controller 1 and pushed to the BACnet MS/TP network 3 by the controller 1 as data relative to the data changes of the standard BACnet objects 64. In an embodiment, for example and without being limitative, the data of a standard BACnet object 64 is transmitted to the controller 1 and pushed to the BACnet MS/TP network 3 by the controller 1 as data relative to the data changes of the standard BACnet objects 64, after a time threshold is reached (for example and without being limitative after 15 minutes) without occurrence of a data change in a standard BACnet object 64.

Still referring to FIGS. 1, 2a and 2b, in the embodiment shown, the controller 1 transmit the system specific data packets conforming to the BACnet MS/TP data packet standards and having the PVSF payload to the network manager 2, over the BACnet MS/TP network 3.

In the embodiment shown, the network manager 2 is in data communication with a central system computing device 18 including the data conversion unit 5, over a BACnet IP network 4. Given that standards for data packets are different in the BACnet MS/TP network 3 and the BACnet IP network 4, in the embodiment shown, in order to transmit the PVSF payload over the BACnet IP network 4, the network manager 2 is configured to re-encapsulate the PVSF into system specific data packets conforming to the BACnet IP data packet standards and once again tagged as proprietary (i.e. using the tag identifying the data packets as specific to the system 50 described herein). The system specific data packets are transmitted from the network manager 2 to the data conversion unit 5 over the BACnet IP network 4.

In the alternative embodiment (not shown) where the sensor 21 and HVAC device 22 communicate directly with the network manager 2 over a BACnet IP network, the network manager 2 can generate the system specific data packets conforming to the BACnet IP data packet standards with the PVSF encapsulated therein (i.e. without requiring prior system specific data packets conforming to the BACnet MS/TP data packet standards being transferred thereto over a BACnet MS/TP network).

Similarly, in alternative embodiments where the sensor 21 and HVAC device 22 communicate with the network manager 2 over one of an Ethernet, ARCNET, or LonTalk BACnet network, the network manager 2 can generate the system specific data packets conforming to the BACnet IP data packet standards with the PVSF encapsulated therein (i.e. without requiring prior system specific data packets conforming to the BACnet MS/TP data packet standards being transferred thereto over a BACnet MS/TP network).

The data conversion unit 5 is configured to receive the PVSF payload included in the system specific data packets and to generate a database write command including the data relative to the data changes of the standard BACnet objects 64. For example and without being limitative, in an embodiment, the main data acquisition database 7 is an on-site SQL database and the data conversion unit 5 is configured to generate an SQL write command including the data relative to the data changes of the standard BACnet objects 64. One skilled in the art will however understand that, in alternative embodiments, other types of databases could be used for the main data acquisition database 7 and consequently, the data conversion unit 5 could be configured to generate a write command corresponding with the type of database being used for the main data acquisition database 7.

One skilled in the art will understand that, in an alternative embodiment, the network manager 2 could communicate with the data conversion unit 5 over a BACnet MS/TP network 3, therefore alleviating the need to re-incapsulate the payload in system specific data packets conforming to the BACnet IP data packet standards. In such an embodiment, the data conversion unit 5 is configured to receive the PVSF payload included in the system specific data packets conforming to the BACnet MS/TP data packet standards (over a BACnet MS/TP network) and to generate database write commands including the data relative to the data changes of the standard BACnet objects 64 therefrom. Similarly, in another alternative embodiment, the network manager 2 could communicate with the data conversion unit 5 over one of an Ethernet, ARCNET, or LonTalk BACnet network also being used for communication between the sensor 21 and HVAC device 22 with the network manager 2. In such an embodiment, the data conversion unit 5 is configured to receive the PVSF payload included in the system specific data packets conforming to the one of the Ethernet, ARCNET, or LonTalk BACnet data packet standards (over the one of the Ethernet, ARCNET, or LonTalk BACnet network) and to generate database write commands including the data relative to the data changes of the standard BACnet objects 64 therefrom.

The data conversion unit 5 is in data communication with the main data acquisition database 7 and communicates the database write commands to the main data acquisition database 7, therefore storing all the data relative to the standard BACnet objects 64 received by the data conversion unit 5 through the PVSF payload included in the system specific data packets in the main data acquisition database 7. For example and without being limitative, in the embodiment shown, the data conversion unit 5 and the main data acquisition database 7 can be both hosted on the central system computing device 18, therefore being in data communication through the databus of the central system computing device 18. In an alternative embodiment (not shown), the data conversion unit 5 and the main data acquisition database 7 can be hosted on different system computers being connected by a local network.

In other alternative embodiments, data conversion unit 5 and the main data acquisition database 7 could be connected through other types of networks, which includes private and public networks, as well as publicly accessible networks of linked networks, possibly operated by various distinct parties, such as, for example and without being limitative, at least one of a personal area network (PAN), a local area network (LAN), a wireless local area network (WLAN), a wide area network (WAN), an enterprise private network (EPN), a virtual private network (VPN), a passive optical local area network (POLAN), etc. or a combination thereof. One skilled in the art will understand that the networks can be embodied using cable connection, satellite connection, cellular connection, etc. or a combination thereof. The network should however be designed and configured to allow the required security level for the secure transfer of the data between the data conversion unit 5 and the main data acquisition database 7. It will be understood that the above-described possibilities relating to the network will also apply to other networks connecting the components of the system 50 described herein, to the exception of the BACnet MS/TP network 3 and the BACnet IP network 4.

In view of the above, it will be understood that the main acquisition database 7 therefore receives and stores all of the data relative to the standard BACnet object 64 over time. In an embodiment, the main acquisition database 7 is also configured to store data relative to the BACnet standard HVAC system 60 setup and operation, which can include, for example and without being limitative, live data logging, archives, user profiles/rights, user activities, system setup, networked devices setup, devices firmware, user's custom application programming, graphical building views, software updates, etc. In an embodiment, the data relative to the BACnet standard HVAC system 60 setup and operation is transmitted form the controller 1 to the network manager 2 and to the data conversion unit 5 for storage into the database 7, using a similar structure as described above regarding the communication and storage of the data relative to the standard BACnet objects 64.

Still referring to FIGS. 1, 2a and 2b, in an embodiment, the system 50 for acquisition and storage of data can also allow data communication between the main acquisition database 7 and at least one user computing device 19. The user computing device 19 can be used to receive user inputs to allow users to read or write data to/from the main acquisition database 7, using, for example, standard protocol SQL queries. One skilled in the art will understand that the capability of users to interacting with the main acquisition database 7, to access data of the BACnet standard HVAC system 60 now stored thereon, leverages the speed of database data communication, and avoids adding data traffic onto the BACnet MS/TP network 3, to retrieve live and/or historical data, thereby allowing multiple simultaneous access to data by users, which could not be achieved using the MS/TP BACnet network 3 or other BACnet networks.

In view of the above, it will be understood that, in the embodiment shown in FIG. 1 for the system 50, only write commands generated by users using the user computing devices 19 and which require implementation in the standard BACnet objects 64 are sent onto the BACnet MS/TP 3 network, therefore generally impacting bandwidth minimally and helping avoiding network congestion or delays for the MS/TP network 3.

In an embodiment, the system for acquisition and storage of data 50 also includes a replicated data acquisition database 10, which is a replication of the main data acquisition database 7. In an embodiment, the main data acquisition database 7 is located on-site (i.e. physically within or proximal to the site of the building being managed by the BACnet standard HVAC system 60), while the replicated data acquisition database 10 is a distant database connected to the main data acquisition database 7 over a network. In an embodiment, the replicated data acquisition database 10 is a cloud-based database being part of a cloud service including a cloud infrastructure 16 with a plurality of computing devices for storing data and performing data processing, as well as a corresponding platform and applications.

In an embodiment, the system for acquisition and storage of data 50, therefore includes a synchronization process unit (or synchronizer) 9 running in the cloud infrastructure 16 and configured to maintain the replicated data acquisition database 10 synchronized with the main data acquisition database 7. In an embodiment, the synchronization process unit 9 is connectable to the main data acquisition database 7 through a secure data communication link, such as, for example and without being limitative a virtual private network 8 (VPN), to monitor and/or receive data from the main data acquisition database 7 relative to data change in the main data acquisition database 7 and to replicate the data from the main data acquisition database 7 on the replicated data acquisition database 10, thereby performing synchronization of the replicated data acquisition database 10 with the main data acquisition database 7.

Still referring to FIGS. 1, 2a and 2b, in an embodiment, the system for acquisition and storage of data 50 further includes a machine learning energy management service 28 performing optimization of the parameters and control of the BACnet standard HVAC system 60, based on data from the data acquisition database 10. The machine learning energy management service 28 generates optimization parameter data by machine learning, using at least one data set including at least a subset of the data stored in the replicated data acquisition database.

For example and without being limitative, the optimization of the parameters and control of the BACnet standard HVAC system 60 can be used to control the HVAC devices 22 of the BACnet standard HVAC system 60 to operate such as to minimize the energy consumption for the building and/or to maximize the comfort of occupants of the corresponding building 17 (e.g. by minimizing temperature variation in the building).

In an embodiment the optimization parameter data generated by the machine learning energy management service 28 can be used by the BACnet standard HVAC system 60 for controlling the HVAC devices 22 of the BACnet standard HVAC system 60. For example and without being limitative, in an embodiment, the optimization parameter data can be communicated to the controller 1, which subsequently controls the HVAC devices 22 to operate in accordance with the optimized parameters.

One skilled in the art will understand that the energy management service 28 can use several types of machine learning for generating the desired optimized parameters and control of the BACnet standard HVAC system 60, such as, for example and without being limitative supervised learning, unsupervised learning, semi-supervised learning, reinforcement learning, transduction, etc. For example and without being limitative, in an embodiment, the machine energy management service 28 can be implemented using AWS machine learning services from Amazon.

In an embodiment, the energy management service 28 is connected to the replicated data acquisition database 10 also using a secure communication link such as a virtual private network 15 (VPN) connection. In an embodiment, the energy management service 28 can access the data using standard database queries such as, for example and without being limitative SQL queries.

One skilled in the art will understand that, given the need for large data sets in order to perform machine learning, the energy management service 28 of the system for acquisition and storage of data 50, can operate as a result of the above-described acquisition and storage of all the data from the standard BACnet objects 64 in the replicated data acquisition database 10 (which can include data of the standard BACnet objects 64 spanning over extended periods and covering different seasons, such as a year or more). Hence, the large data set of the replicated data acquisition database 10, including data of the standard BACnet objects 64 spanning over extended periods and covering different seasons allows the energy management service 28 to anticipate and predict building behavior, according to each season, for subsequent optimization of the parameters and control of the BACnet standard HVAC system 60 in accordance with the predicted building behavior for a current time period (such as, for example a current season).

One skilled in the art will understand that, in an alternative embodiment (not shown), the machine learning energy management service 28 could be connected to the main data acquisition database 7 rather than the replicated data acquisition database 10.

In an embodiment, the system for acquisition and storage of data 50 can also include additional services in connection with the replicated data acquisition database 10. For example and without being limitative, the system for acquisition and storage of data 50 can include a remote user service allowing users to perform building management using a user computing device 20 connected to the replicated data acquisition database 10 through a secure data transfer protocol such as, for example an HTTPS data communication protocol using an HTTPS to SQL conversion service 13. In such an embodiment, once again only write commands generated by users using the user computing device 20, which need to be implemented in the standard BACnet objects 64 are required to be sent thru the BACnet MS/TP 3 network, therefore generally impacting bandwidth minimally and helping avoiding network congestion or delays for the MS/TP network 3.

The system for acquisition and storage of data 50 can also include a cloud backup service 23 providing snap shots images of the database 10; a disaster recovery service 24 allowing restoration of the replicated data acquisition database 10 and/or the main data acquisition database 7 at specific dates; an API interface service 30 providing remote access to the replicated data acquisition database 10 to mobile devices 25; an alarm service 29 which can scan alarm flags inside the replicated data acquisition database 10 and send to appropriate user mobile devices 26 alarm status using for example SMS or Emails standard protocols; a custom dashboard service 31 providing a building status overview of the building to remote user computing devices 27, etc. In an embodiment, the additional services can for example be software as a service (SAS) implemented services.

The system 50 for acquisition and storage of data from a BACnet standard HVAC system having been described in detail above, the associated method for acquisition and storage of data from a BACnet standard HVAC system will now be described below.

Figure 3:
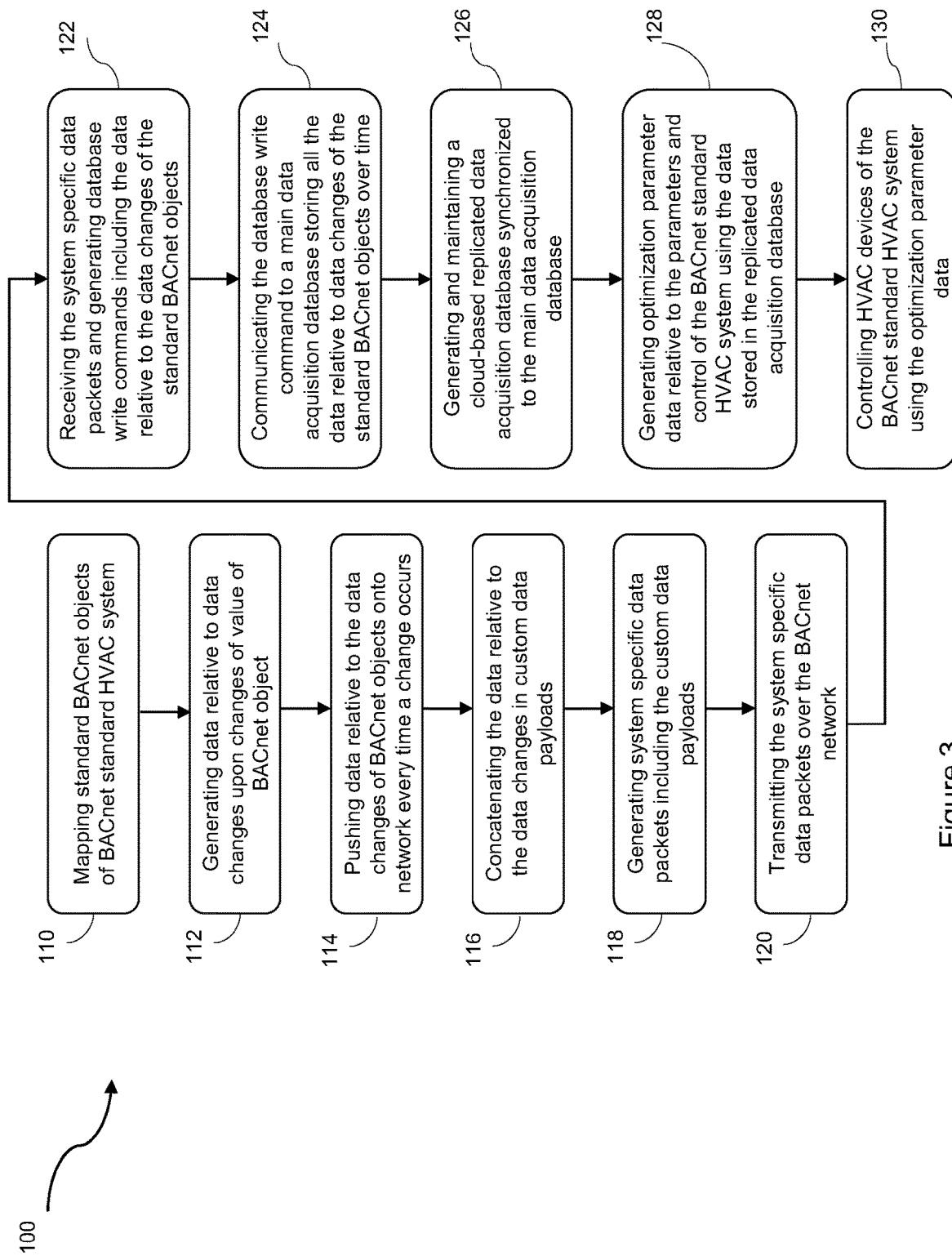
FIG. 3 is a flowchart showing the steps of a method for acquisition and storage of data relative to BACnet objects of a BACnet standard HVAC system and subsequent generation of optimization parameter data relative to the parameters and control of the BACnet standard HVAC using the data acquired and stored, for subsequent control of the HVAC devices of the BACnet standard HVAC system using the optimization parameter data, in accordance with an embodiment.

Referring to FIG. 3, in an embodiment the method 100 includes the step 112 of providing physical inputs and outputs to sensor and HVAC devices deployed around a building, from a controller, using a BACnet MS/TP network and mapping standard BACnet objects, with each sensor and HVAC device defining a BACnet device object, in turn defining one or more BACnet object.

The method also includes the step 112 of generating data relative to data changes upon changes in value, for each one of the standard BACnet objects and step 114 of pushing data relative to the data changes of the corresponding one of the standard BACnet objects to the controller and onto the BACnet MS/TP network, every time a change occurs in a value thereof. In an embodiment (not shown), the method can also include the step of pushing data relative to a data changes of a corresponding one of the standard BACnet objects onto the BACnet network, after a time threshold is reached without occurrence of a data change in the corresponding one of the standard BACnet objects.

At steps 116, 118 and 120, the method further includes concatenating the data relative to the data change in a custom data payload (step 116), generating system specific data packets conforming to the BACnet data packet standards (step 118) and transmitting the system specific data packets over the BACnet network (step 120). The system specific data packets include the custom data payloads and are tagged as proprietary.

In an embodiment, the specific data packets can be initially generated to conform to the BACnet MS/TP data packet standards and the system specific data packets can be transmitted over a BACnet MS/TP network. In an embodiment, the method can also include the step of re-encapsulating the custom data payload of the system specific data packets conforming to the BACnet MS/TP data packet standards into system specific data packets conforming to the BACnet IP data packet standards (once again including the custom data payloads and being tagged as proprietary) and transmitting the system specific data packets from a network manager to a data conversion unit, over a BACnet IP network.

In an embodiment, the method also includes the step 122 of receiving the custom data payload included in system specific data packets conforming to the BACnet data packet standard and generating database write commands including the data relative to the data changes of the standard BACnet objects therefrom.

Subsequently, the method includes step 124 of communicating the database write command to a main data acquisition database storing all the data relative to the standard BACnet object therein, over time.

In an embodiment, the method also includes the step 126 of generating and maintaining a cloud-based replicated data acquisition database synchronized to the main data acquisition database. In an embodiment, this includes connecting the cloud-based replicated data acquisition database to the main data acquisition database with a synchronization process unit, receiving data from the main data acquisition database by the synchronization process unit and replicating the data from the main data acquisition database on the replicated data acquisition database using the synchronization process unit.

In an embodiment, the method further comprises step 128 of generating optimization parameter data relative to the parameters and control of the BACnet standard HVAC system. As described above, in an embodiment, the optimization parameter data is generated by machine learning using a data set including at least one machine learning model using at least a subset of the data stored in the replicated data acquisition database. One skilled in the art will once again understand that, in an alternative embodiment, the optimization data could be generated by machine learning using a data set including at least a subset of the data stored in the main data acquisition database.

In an embodiment, the method further includes step 130 of controlling HVAC devices of the BACnet standard HVAC system using the optimization parameter data. In an embodiment, this step can include communicating the optimization parameter data to the controller for the controller to subsequently control the HVAC devices of the BACnet standard HVAC system in accordance with optimized parameters of the optimization parameter data.

The skilled reader will readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The embodiments are also intended to cover computers programmed to perform said steps of the above-described methods.

It should be appreciated by those skilled in the art that any block diagrams herein represent conceptual views of illustrative circuitry embodying the principles disclosed herein. Similarly, it will be appreciated that any flow charts and transmission diagrams, and the like, represent various processes which may be substantially represented in computer readable medium and so executed by a computer or processor, whether or not such computer or processor is explicitly shown.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention could be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited solely by the scope of the appended claims.

The invention claimed is:

1. A system for acquisition and storage of data relative to Building Automation Control Network (BACnet) objects of a BACnet standard Heating, Ventilation, and Air Conditioning (HVAC) system, the system comprising:

the BACnet HVAC system including at least one controller and the BACnet objects each generating data relative to a data change upon each occurrence of a change in a value thereof or after a time threshold is reached without occurrence of a change in a value thereof, the BACnet objects each being connected to a corresponding one of the at least one controller and each transmitting the data relative to the data change every time a change occurs in the value thereof or after the time threshold is reached without occurrence of a change in the value thereof, the BACnet HVAC system having a BACnet network and the at least one controller being configured to concatenate the data relative to the data changes of the BACnet objects into payloads encapsulated into system specific data packets conforming to the BACnet data packet standards and transmitted over the BACnet network;

a data conversion unit in data communication with the BACnet HVAC system over the BACnet network and receiving the system specific data packets, the data conversion unit being configured to retrieve the data relative to the data changes of the BACnet objects from the received system specific data packets and to generate database write commands including the data relative to the data changes of the BACnet objects acquired from the system specific data packets; and a main data acquisition database in data communication with the data conversion unit and receiving the database write commands therefrom, the main data acquisition database storing the data relative to all data changes of the BACnet objects, with predetermined time periods without occurrence of a change in the value of the corresponding one of the BACnet objects being treated as a data change.

2. The system of claim 1, wherein the data conversion unit and the main data acquisition database are either hosted on a same central system computing device or on distinct computing devices connected over a local network.

3. The system of claim 1, further comprising a cloud-based replicated data acquisition database running in a cloud infrastructure and a synchronization process unit configured to maintain the replicated data acquisition database synchronized with the main data acquisition database, the synchronization process unit being connectable to the main data acquisition database to receive data from the main data acquisition database and to replicate the data from the main data acquisition database on the replicated data acquisition database to perform synchronization therebetween.

4. The system of claim 3, further comprising a machine learning energy management service using machine learning to optimize parameters and control of the BACnet standard HVAC system, the machine learning energy management service being connected to one of the main data acquisition database and the replicated data acquisition database and using at least one data set including at least a subset of the data stored in the one of the main data acquisition database and the replicated data acquisition database for generating optimization parameter data.

5. The system of claim 4, wherein the optimization parameter data is directed towards at least one of a minimization of the energy consumption of a building implementing the BACnet standard HVAC system and the maximization of the comfort of occupants of the corresponding building.

6. The system of claim 4, wherein the optimization parameter data generated by the machine learning energy management service is used by the BACnet standard HVAC system for controlling the HVAC devices thereof.

7. The system of claim 6, wherein the optimization parameter data is communicated to the controller, which subsequently controls the HVAC devices of the BACnet standard HVAC system in accordance with optimized parameters of the optimization parameter data.

8. The system of claim 4, wherein the data relative to all data changes of the standard BACnet objects stored in the main data acquisition database spans over at least a time period covering different seasons, the machine learning energy management service being configured to anticipate and predict building behavior, according to each season.

9. A method for acquisition and storage of data relative to Building Automation Control Network (BACnet) objects of a BACnet standard Heating, Ventilation, and Air Conditioning (HVAC) system operating over a BACnet network and including a controller, the method comprising the steps of:
mapping BACnet objects of the BACnet standard HVAC system, each one of the BACnet objects generating data relative to a data change upon each occurrence of a change in value thereof;
pushing data relative to the data changes of a corresponding one of the BACnet objects onto the BACnet network every time a change occurs in a value thereof or after a time threshold is reached without occurrence of a change in a value thereof;
concatenating the data relative to the data changes of the BACnet objects in custom data payloads and generating system specific data packets including the custom data payloads and conforming to the BACnet data packet standards;
transmitting the system specific data packets over the BACnet network;
receiving the custom data payloads included in the system specific data packets and generating database write commands including the data relative to the data changes of the BACnet objects; and
communicating the database write command to a main data acquisition database storing all the data relative to data changes of the BACnet objects over time, with predetermined time periods without occurrence of a change in the value of the corresponding one of the BACnet objects being treated as a data change.

10. The method of claim 9, further comprising the step of generating and maintaining a cloud-based replicated data acquisition database synchronized with the main data acquisition database.

11. The method of claim 10, wherein the step of generating and maintaining a cloud-based replicated data acquisition database synchronized with the main data acquisition database comprising connecting to the main data acquisition database with a synchronization process unit, receiving data from the main data acquisition database by the synchronization process unit and replicating the data from the main data acquisition database on the replicated data acquisition database using the synchronization process unit.

12. The method of claim 11, further comprising the step of controlling HVAC devices of the BACnet standard HVAC system using the optimization parameter data.

13. The method of claim 12 comprising the step of communicating the optimization parameter data to the controller, the controller subsequently controlling the HVAC devices of the BACnet standard HVAC system in accordance with optimized parameters of the optimization parameter data.

14. The method of claim 10, further comprising the step of generating optimization parameter data relative to the parameters and control of the BACnet standard HVAC system, the optimization parameter data being generated by machine learning using at least one machine learning model using at least one data set including at least a subset of the data stored in one of the replicated data acquisition database and the main data acquisition database.

15. The method of claim 14, wherein the optimization parameter data is directed towards at least one of a minimization of the energy consumption of a building implementing the BACnet standard HVAC system and the maximization of the comfort of occupants of the corresponding building.

16. The method of claim 9, wherein the step of pushing data relative to the data changes of a corresponding one of the BACnet objects onto the BACnet network every time a change occurs in a value thereof includes pushing the data relative to the data changes of the corresponding one of the BACnet objects to the controller.

* * * * *